(12) United States Patent
Brabant

(10) Patent No.: US 7,467,247 B2
(45) Date of Patent: Dec. 16, 2008

(54) TIMEOUTS ON ACCESSING A SHARED RESOURCE

(75) Inventor: Richard Brabant, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 11/261,663

(22) Filed: Oct. 31, 2005

(65) Prior Publication Data

US 2007/0101206 A1    May 3, 2007

(51) Int. Cl.
*G06F 12/00* (2006.01)
(52) U.S. Cl. .................. 710/240; 711/152; 370/401
(58) Field of Classification Search ............... 710/220, 710/316–317, 240; 370/401; 711/147, 150–152
See application file for complete search history.

(56) References Cited

U.S. PATENT DOCUMENTS

| | | | |
|---|---|---|---|
| 6,301,642 B1 * | 10/2001 | Jones et al. ................. 711/151 |
| 6,970,476 B1 * | 11/2005 | Jonsson et al. ............. 370/401 |
| 7,051,150 B2 * | 5/2006 | Naumann et al. ........... 710/317 |
| 7,197,016 B2 * | 3/2007 | Belcea ...................... 370/321 |
| 2006/0268925 A1 * | 11/2006 | Sarkar ....................... 370/447 |

* cited by examiner

*Primary Examiner*—Clifford H Knoll

(57) ABSTRACT

A computer-implemented method of generating timeout errors based on shared register access by two processors is described. A processor access timer is started responsive to generation of an access request by a first processor. The generated first processor access request is transmitted to a shared storage component including a shared register and able to communicate with both the first and second processors. A timeout error is generated responsive to the processor access timer exceeding a processor predetermined timeout threshold value.

18 Claims, 2 Drawing Sheets

TIMEOUTS ON ACCESSING A SHARED RESOURCE

FIELD

The disclosed embodiments relate to timeouts on access of a shared resource.

BACKGROUND

A timeout is a predetermined period of time which elapses in a system prior to the occurrence of a specified event. Oftentimes, a solution to a non-responsive system is a reset of the entire system on expiration of a timeout. Resetting the entire system enacts a toll in terms of downtime of the system which may have a significant impact on operation of the system and/or services provided by the system.

SUMMARY

The present embodiments provide a generation of timeouts based on share resource access.

A method embodiment includes generating timeout errors based on shared resource access by two processors. A processor access timer is started responsive to generation of an access request by a first processor. The generated first processor access request is transmitted to a shared storage component including a shared register and able to communicate with both the first and second processors. A timeout error is generated responsive to the processor access timer exceeding a processor predetermined timeout threshold value.

Still other advantages of the embodiments will become readily apparent to those skilled in the art from the following detailed description, wherein the preferred embodiments are shown and described, simply by way of illustration of the best mode contemplated of carrying out the invention. As will be realized, the invention is capable of other and different embodiments, and its several details are capable of modifications in various obvious respects, all without departing from the embodiments.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
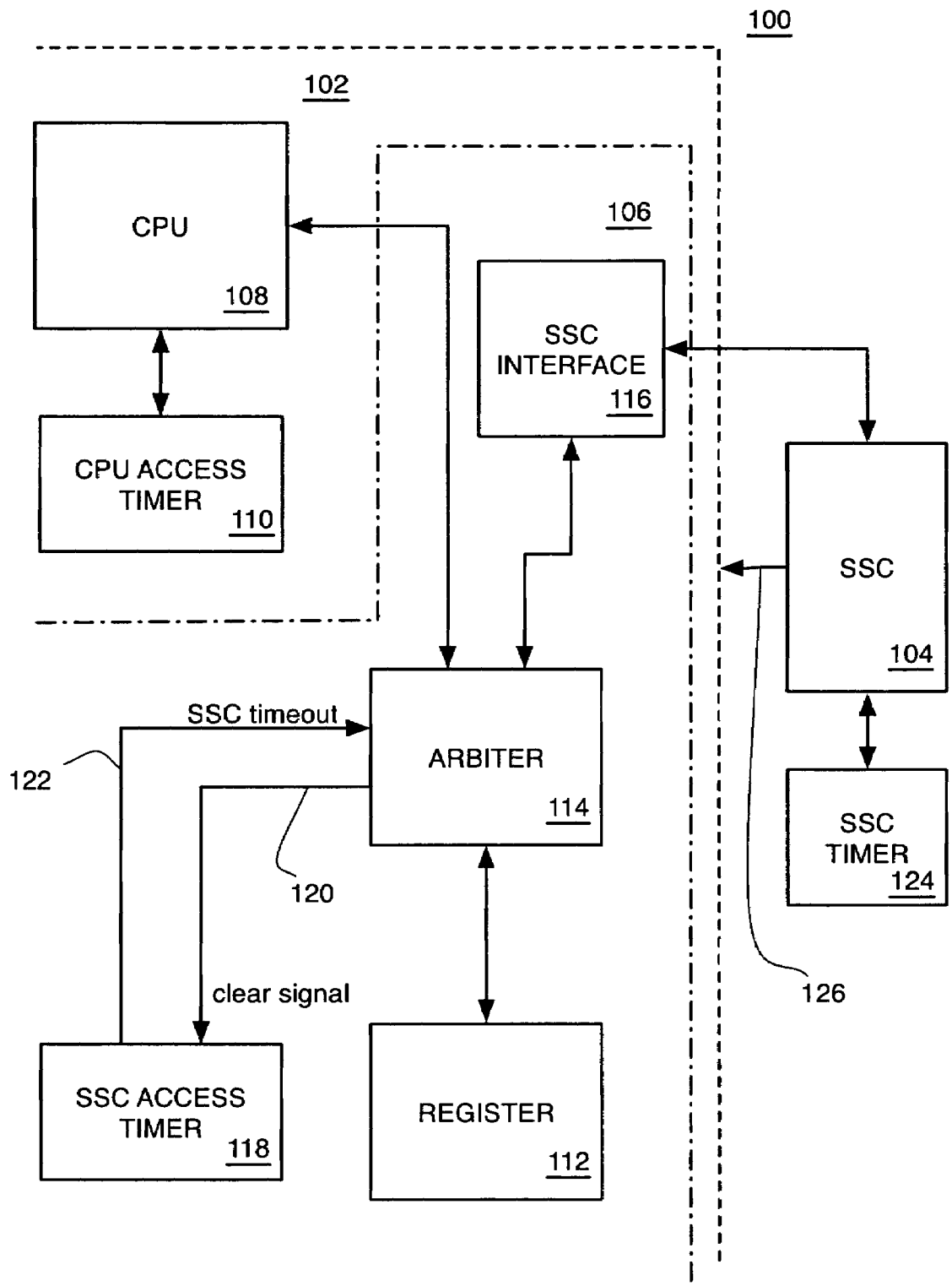
FIG. 1 is a high level block diagram of a network switch according to an embodiment.

FIG. 1 depicts a high level block diagram of a network switch 100 including a processing component 102 and a supervisor component 104. Both processing component 102 and supervisor component 104 are connected to, and access, a shared storage component 106. Supervisor component 104 manages the network switch 100. Individual timeout value thresholds are set and used to generate timeouts for both processing component 102 and supervisor component 104 accesses of shared storage component 106. Generated timeouts are specific to a particular access attempt.

Network switch 100 is a device connecting one or more processing components 102. The number of processing components is related to the number of different connections a network switch 100 supports. Processing components 102 are interconnected together internally of network switch 100 and scale up in number in order to support an increasing number of network interconnections.

Network switch 100 includes different layers of hierarchical interdependent executable instruction sets. Switch 100 configuration and management is handled by supervisor component 104 executing an executable set of instructions as a supervisor program.

An example network switch 100 is a PROCURVE networking switch available from Hewlett-Packard Corporation of Palo Alto, Calif.

In other embodiments, network switch 100 includes more than one processing component 102. In still further embodiments, supervisor component 104 may be another processing component 102.

Processing component 102 includes a processor, e.g., a central processing unit (CPU) 108, and additional support components, e.g., a CPU access timer 110, arranged to interpret network protocols, open frames of packets, and re-frame the packet frames for transmission to an appropriate destination, and other network functionality, etc. Processor 108, e.g., an embedded ARM9 microprocessor, includes microprocessors, processors, e.g., general purpose and special purpose processors, and application specific integrated circuits (ASICs). Processor 108 is responsible for management and control of reception and transmission of network packets received by network switch 100.

For a given processing component 102, more than one set of executable instructions may be executed, i.e., processing component 102 may include multi-processing capability. Network switch 100 executes one or more concurrent copies of the executable instructions. Multiple processes executed by network switch 100 execute independent from each other; however, the network switch configuration defines the exact scope of each individual process.

Shared storage component 106, e.g., a shared data register, shared processing functionality, etc., is accessed by both processing component 102 and supervisor component 104 and shared by one or more different processes executed by the components 102, 104. Shared storage component 106 is described in detail below.

Supervisor component 104, e.g., a system support chip (SSC), is a processor-based device managing network switch 100 responsive to execution of a set of executable instructions. Supervisor component 104 executing the instructions accesses, i.e., reads and writes, data from/to shared storage component 106.

Supervisor component 104 accesses data from shared storage component 106 without communicating with CPU 108. Offloading CPU 108 from having to handle data requests from supervisor component 104 directed to shared storage component 106 reduces the load on processor 108. In the network switch 100 example, processor 108 freed of handling requests from SSC 104 bound for shared storage component 106 is able to perform additional management and networking functionality, e.g., process additional data packets.

Further, separating access between processing component 102 and supervisor component 104 enables either processing component or supervisor component to investigate the status of switch 100 in the event of a crash or other debilitating state or occurrence. That is, even if CPU 108 becomes disabled, SSC 104 is able to query data stored in shared storage component 106.

Turning now to shared storage component 106, the storage component includes a register 112 storing data accessed by either of processing component 102 and supervisor component 104. Register 112 includes a data storage device such as a memory or a functional logic device such as a counter or other capability. In other embodiments, there may be more than one register 112.

Shared storage component 106 also includes an arbiter 114. Arbiter 114 manages access to register 112 responsive to communication from processing component 102, e.g., by way of a processor bus (not shown), and supervisor component 104 by way of a supervisor component interface, i.e., SSC interface 116. Arbiter 114 is a logic device including a finite state machine for performing predetermined functionality (operation of arbiter 114 is described in detail below with reference to FIG. 2). In this case, arbiter 114 arbitrates read/write requests communicated to register 112 from CPU 108 and SSC 104. Arbiter 114 interacts with an SSC access timer 118. Specifically, arbiter 114 transmits a signal over clear signal connection 120 to clear a timeout indication generated by SSC access timer 118 and transmitted to the arbiter over an SSC access timeout connection 122.

In an embodiment, arbiter 114 drives a clear signal along clear signal connection 120 preventing activation of SSC access timer 118 until an access by supervisor component 104 is received from SSC interface 116. Driving of the clear signal prevents generation of an SSC timeout signal from SSC access timer 118 to arbiter 114. After arbiter 114 transmits an access request received from SSC interface 116 to register 112, the arbiter stops driving the clear signal along clear signal connection 120 thereby enabling operation of SSC access timer 118, i.e., the SSC access timer begins counting. After a predetermined SSC timeout value is reached by SSC access timer 118, the timer generates an SSC access timeout signal over SSC timeout connection 122 to arbiter 114. In this manner, SSC access timer 118 signals expiration of the timer to arbiter 114. In other embodiments, different specific signaling mechanisms for starting and stopping the operation of SSC access timer 118 are used, e.g., a start signal is driven from arbiter 114 to SSC access timer 118 over clear signal connection 120 in order to begin operation of the SSC access timer.

Supervisor component 104 accesses to register 112 occur through SSC interface 116, e.g., a serial and bidirectional interface. In an embodiment, SSC interface 116 translates back and forth a serial data stream in parallel, acting as a de-serializer and a serializer between arbiter 114 and SSC 104. SSC interface 116 translates serial requests from supervisor component 104 to parallel requests for transmission to arbiter 114 as register 112 accesses are made under a parallel data protocol. In other embodiments, SSC 104 transmits access requests for register 112 in the same format as CPU 108 thereby obviating the need for a specific SSC interface 116 in shared storage component 106.

As the shared register 112 is accessible by either processor, CPU 108 or SSC 104, arbiter 114 regulates access to the shared register 112. Arbiter 114 permits only a single access of register 112 at a time by either CPU 108 or SSC 104. As in other embodiments there may be more than a single register 112 for access, arbiter 114 controls transmission of access requests to each of the downstream registers 112. Arbiter 114 holds any incoming register access request as long as a pending register access has not yet completed. Register accesses are handled by arbiter 114 on a first come, first serve basis. Fairness and alternate access is provided by the fact that each component (processing component 102 and supervisor component 104) access always gets a few free cycles (no request) between two (2) consecutive accesses.

Operation of Arbiter

Figure 2:
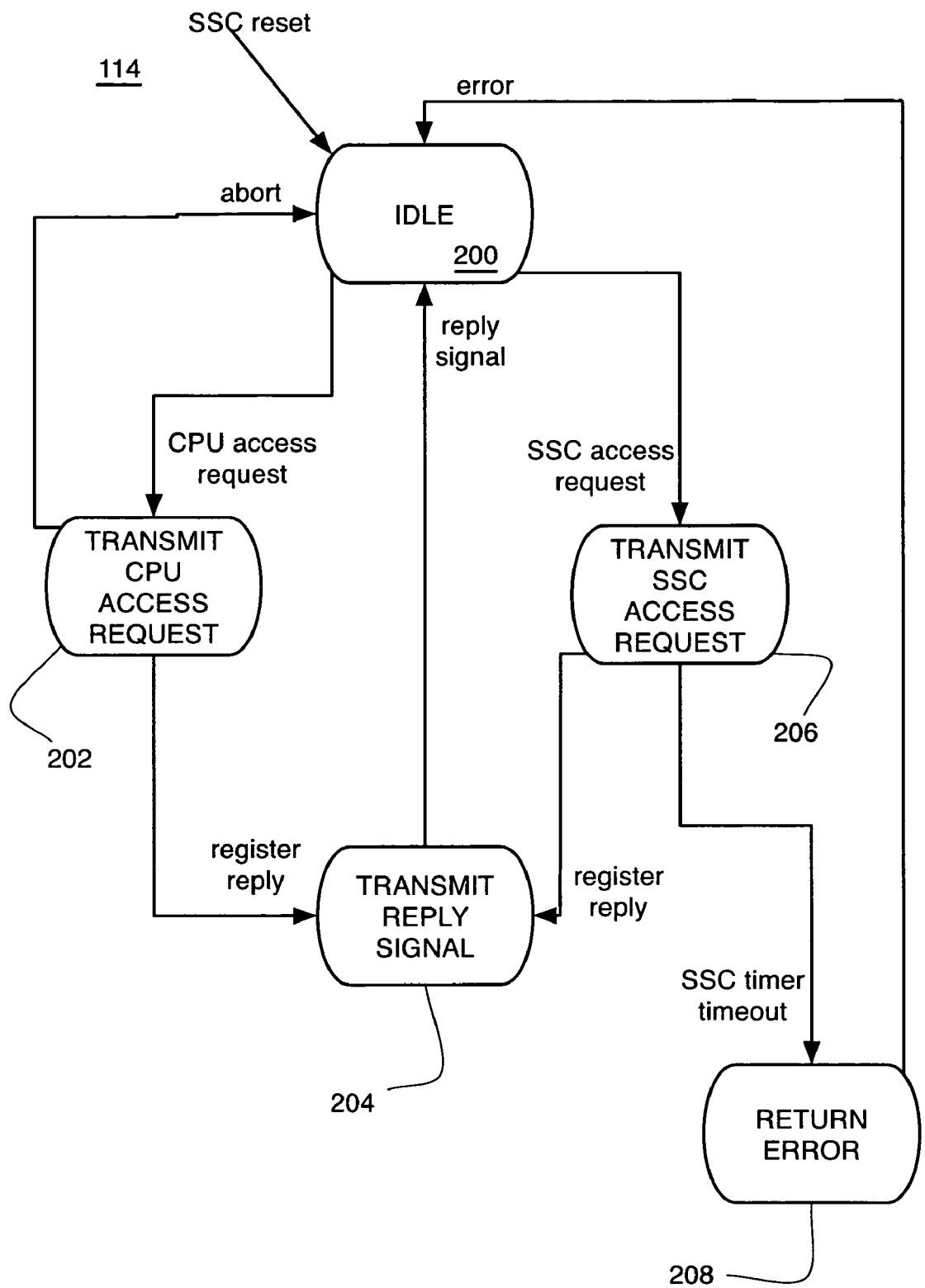
FIG. 2 is a high level process flow diagram of the arbiter of FIG. 1.

FIG. 2 depicts a process flow diagram of operation of a portion of arbiter 114 according to an embodiment. The depicted process flow is carried out by execution of one or more sequences of executable instructions. In another embodiment, the process flow is carried out by an arrangement of hardware logic, e.g., an ASIC. The flow begins at step 200 wherein arbiter 114 is idle, i.e., the arbiter has not received or transmitted an access request from CPU 108 or SSC 104. Arbiter 114 exits the idle state after receipt of an access request from CPU 108 or SSC 104.

If arbiter 114 receives an access request from CPU 108, the flow of control proceeds to step 202 wherein the arbiter communicates the access request to register 112 and waits for a reply. If a reply is received from register 112, the flow of control proceeds to step 204 and the arbiter 114 generates and transmits a reply signal to CPU 108 incorporating at least a portion of the received register reply and transitions to return to step 200. If an abort signal is received from CPU 108 (as a result of, among other things, expiration of CPU access timer 110), the flow of control returns to step 200 and any outstanding access request to register 112 is terminated by arbiter 114. For example, arbiter 114 transmits a signal to register 112 causing the register to terminate processing of the access request.

If arbiter 114 receives an access request from SSC 104, the flow of control proceeds to step 206 wherein the arbiter communicates the access request to register 112 and waits for a reply. Similar to the above-described functional flow regarding a CPU 108 access request, if a reply is received from register 112, the flow of control proceeds to step 204 and the arbiter 114 generates and transmits a reply signal to SSC 104 incorporating at least a portion of the received register reply and transitions to return to step 200.

If, at step 206, SSC access timer 118 expires, e.g., the timer reaches the predetermined SSC timeout threshold value, and transmits the SSC timeout signal along SSC timeout connection 122 to arbiter 114, the flow of control proceeds to step 208 and the arbiter generates and transmits an error signal to SSC 104 via SSC interface 116 and returns to idle at step 200.

If, as described in further detail below, SSC timer 124 expires, e.g., the timer reaches the predetermined SSC timer timeout threshold value, and generates a timeout signal to SSC 104, SSC 104 generates and transmits an SSC reset signal to processing component 102 via reset connection 126 causing a reset of processing component 102 including arbiter 114. Thus, SSC reset signal may be received by arbiter 114 at any point during operation of the flow of FIG. 2.

Different Timeouts

There are at least 3 different timeouts in network switch 100. The list of timeouts includes:
1. SSC interface 116 access timeout (switch 100 internal timeout), or SSC access timer 118;
2. Processing component 102 timeout (switch 100 internal timeout), or CPU 108 and CPU access timer 110; and
3. Supervisor component 104 access timeout, or SSC timer 124.

Each timeout is now addressed in further detail.

SSC Interface 116 Access Timeout

On power up of network switch 100, SSC interface 116 access timeout as determined by SSC access timer 118 is disabled and must be enabled in order to be operational. In an embodiment, a range of the timeout is a minimum of 16 clock periods of a 200 MHz core clockspeed, up to 256 periods of the same clock. In an embodiment, the range in time of the SSC interface 116 timeout is from a minimum of 80 nanoseconds (ns) up to 20.5 microseconds (μs).

Processing Component 102 Timeout

On power up of network switch 100, processing component 102 timeout as determined by CPU access timer 110 is disabled and must be enabled in order to be operational. In an embodiment, a range of the timeout is programmable by steps, e.g., 8 μs from a minimum number of 1 up to a maximum of 7 times 8 μs (56 μs). On a processor 108 access request directed to register 112, CPU access timer 110 is started and reset or cleared on completion of a pending access request to the register. If an access request fails to complete on time (CPU access timer 110 expires), CPU 108 considers the pending access to be errored and the target device, i.e., register 112, to be not responding and transmits a signal to arbiter 114 to abort the pending access request to the register.

Supervisor Component 104 Timeout

On power up of network switch 100, supervisor component 104 timeout as determined by SSC timer 124 is disabled and must be enabled in order to be operational. Supervisor component 104 timeout is external to processing component 102 and on expiration will cause SSC 104 to reset processing component 102. The entire reset of the processing component 102 caused by SSC timer 124 occurs in exceptional and rare cases and for security margin the SSC 104 timeout is set-up at an order of 10 times a required minimum time (the minimum time is described more fully below).

Timeout Operation

The two network switch 100 internal timeouts, i.e., SSC interface 116 timeout and processing component 102 timeout, are separate and independent of each other.

SSC Interface 116 Timeout

SSC interface 116 timeout occurs as a result of an access request from SSC 104 not completing, i.e., a response fails to be provided back to arbiter 114 bound for the requesting SSC 104 within a predetermined SSC timeout threshold value. SSC access timer 118 keeps track of the amount of time elapsed before a particular access request completes. If the SSC interface 116 timeout is enabled (SSC access timer 118 is counting), on each read or write received by register 112 from SSC interface 116, SSC access timer 118 is triggered and then cleared by arbiter 114 on completion of the given transaction. Arbiter transmits, i.e., drives, a clear timer signal over clear signal connection 120 to SSC access timer 118.

Each access (read or write) received over SSC interface 116 is monitored and timed. If the SSC interface 116 access fails to complete in less time than a predetermined SSC interface threshold value of SSC access timer 118, then the requested access (read or write) is errored to the SSC interface and terminated.

SSC access timer 118 is triggered after arbiter 114 transmits an access request received from SSC interface 116 to register 112. In other words, SSC access timer 118 is not counting the time during which a requested SSC 104 transaction might be waiting for completion of a earlier started CPU 108 based access request. SSC access timer 118 does not take into account the sitting time of a requested SSC 104 transaction waiting for arbiter 114 to resolve the possible conflict of two register accesses coming from either processing component 102 or supervisor component 104.

Processing Component 102 Timeout

Processing component 102 timeout occurs as a result of an access request from processor 108 not completing, i.e., a response fails to be provided back to the requesting processor 108 within a predetermined processor timeout threshold value. CPU access timer 110 keeps track of the amount of time elapsed prior to completion of a particular access request from processor 108 to register 112 by way of arbiter 114. If processing component 102 timeout is enabled (i.e., CPU access timer 110 is counting), each read or write generated by processor 108 causes CPU access timer 110 to be triggered and then cleared by processor 108 on completion of the given transaction (read or write request).

Each access (read or write) transmitted by processor 108 is monitored and timed. If the processor 108 access fails to complete in less time than the predetermined processor timeout threshold value of CPU access timer 110, then the requested access (read or write) is errored to the processor and terminated by transmission to arbiter 114.

On processor 108 access to register 112, the requested transaction might be waiting for the completion of an SSC interface 116 access started earlier in a particular case. Arbiter 114 resolves the possible conflict of two register 112 accesses coming from either processing component 102 or SSC 104 through SSC interface 116 by holding a processor 108 access request as long as a pending SSC 104 access request is not complete.

In order that the CPU access timer 110 remains independent of the SSC interface 116 timeout the predetermined processor timeout threshold value of the processing component 102 timeout must take into account the possible waiting time of a processor 108 transaction (access request) sitting at arbiter 114 prior to being handled upon the completion of a pending SSC interface 116 access request. This is needed as a given SSC interface 116 access request may eventually timeout.

In operation, the predetermined timeout threshold values, i.e., SSC interface 116 access threshold and CPU 108 access threshold, are set to values representing that a given register 112 access will not be successful and need to be terminated and an error generated. The predetermined timeout threshold values specify the time at which each timer, i.e., SSC access timer 118 and CPU access timer 110, generates a timeout signal. At a minimum, the threshold values are longer than the time required for a successful register 112 access. False positives, i.e., incorrectly reporting a timeout due to an improperly short timeout threshold value, are avoided as each individual timeout threshold value takes into account the worst case waiting period for receiving a response to an access request.

The worst case waiting period for a successful register 112 access from the point of view of a given process, i.e., a process executed by either processor 108 or SSC 104, is the total amount of the worst case period of every transaction taking place in series. The SSC interface 116 timeout and CPU 108 timeout are each described in turn.

SSC Interface 116 Timeout or SSC Access Timer 118

The lowest level in the hierarchy of different network switch 100 timeouts described above is the SSC interface 116 timeout, also referred to as a register access timeout and/or a predetermined SSC access timeout threshold value. SSC access timer 118 starts to count at the beginning of the SSC 104 access request after arbiter 114 transmits an access request to register 112. Arbiter 114 clears SSC access timer 118 on receipt of the reply (or "ack" for acknowledgement) from register 112. If no "ack" is received before SSC access timer 118 expires, i.e., timer 118 reaches or exceeds predetermined SSC access timeout threshold value, then on expiration the SSC timeout signal transmitted to arbiter 114 over SSC timeout connection 122 causes the arbiter to abort the pending access request and transmit an error to SSC interface 116 for communication back to SSC 104. Thus, SSC access timer 118 is set to a predetermined SSC access timeout threshold value which includes the time required for an access request to be transmitted to a register 112, the register to process the access request, and the register to transmit a response to arbiter 114.

As a result of experiments performed by the inventor, the worst case timing for accessing register 112 without additional network traffic being handled by network switch 100 is approximately 30 core clock cycles, i.e., 30 clock cycles of a system clock (not shown) of the network switch. The predetermined SSC access timeout threshold value may be set in a range from 32 to 128 clock cycles. In another embodiment, the threshold value is set at a value greater than 64 clock cycles. In an embodiment, the predetermined SSC access timeout threshold value includes a clock cycle-based buffer time, e.g., one or more additional clock cycles.

CPU 108 Timeout or CPU Access Timer 110

The worst case for the series of events that occur as a result of CPU 108 accessing register 112 include:

1. The longest time during which a CPU 108 access request is held by arbiter 114 waiting for an SSC interface 116 access request to complete or exceed the predetermined SSC access timeout threshold value; The longest time which SSC access timer 118 exceeds the predetermined threshold value and generates an SSC timeout;
2. If there is more than a single register 112, the register requested to be accessed by CPU 108 is the register taking the most time among all registers 112; and
3. The additional time for the access request transmission path (round trip) from processor 108 to register 112 is estimated to be approximately 42 clock cycles.

The CPU 108 predetermined processor timeout threshold value is greater than the sum of the individual time for the 3 event timeouts described above. The CPU 108 predetermined processor timeout threshold value is selected to satisfy the following equation:

$$CPU\ 108\ timeout \geqq SSC\ interface\ 116\ timeout\ (predetermined\ SSC\ access\ timeout\ threshold\ value) + CPU\ 108\ round\ trip\ register\ access\ time + a\ clock\ cycle\text{-}based\ buffer\ time$$

CPU 108 register access time is the amount of time for a CPU 108 based access request to be transmitted from the CPU to a register 112 via arbiter 114, processed by the register, and transmitted from the register to the CPU via the arbiter. The clock cycle-based buffer time is a value in the range of approximately 0 to 128 clock cycles with a particular embodiment range of between 64 and 128 clock cycles.

Supervisor Component 104 Timeout

The worst case for the series of events that occur as a result of an SSC 104 access request of register 112 include:

1. The time required by SSC interface 116 to deserialize an incoming write from SSC 104;
2. The time during which an SSC 104 access request is held by arbiter 114 waiting for a CPU 108 access request to complete;
3. The time during which CPU access timer 110 exceeds the predetermined threshold value and generates a CPU 108 timeout;
4. The register requested to be accessed by CPU 108 is the register taking the most time; and
5. The additional time for the data path from SSC interface 116 to register 112 is estimated to be approximately 6 clock cycles.

The SSC 104 predetermined timeout threshold value must be greater than the sum of the individual time for the 5 events described above. The SSC 104 predetermined timeout threshold value is selected to satisfy the following equation:

$$SSC\ 104\ timeout \geqq SSC\ interface\ 116\ timeout\ (predetermined\ SSC\ access\ timeout\ threshold\ value) + CPU\ 108\ timeout + SSC\ interface\ 116\ traversal\ time + clock\ cycle\text{-}based\ buffer\ time$$

With respect to the SSC 104 timeout, the SSC interface 116 traversal time is the amount of time for an access request to be transmitted across SSC interface 116 between SSC 104 and arbiter 114. In an embodiment, the SSC interface 116 traversal time is the time for an access request to be transmitted in a single direction across the SSC interface. In another embodiment, the SSC interface 116 traversal time is the time for an access request to be transmitted in both directions across the SSC interface. The clock cycle-based buffer time is a value in the range of approximately 0 to 40 clock cycles with a particular embodiment value of 40 clock cycles.

Based on the above-described embodiments, each independent process is guaranteed to resolve its own proper register access error independently from each other, even in the case of shared registers.

The hierarchical processes retain their proper rank level in networking switch 100 without interfering with the other processes.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A computer-implemented method of generating timeout errors based on shared register access by at least two processors comprising a portion of a network switch, comprising:
    starting a processor access timer of the network switch responsive to generation of an access request by a first processor of the network switch;
    transmitting the generated first processor access request to a shared storage component comprising a portion of the network switch including a shared register and able to communicate with both the first processor and another processor of the network switch, wherein the shared storage component arbitrates read access to the shared register between the first processor and the other processor; and
    generating a timeout error responsive to the processor access timer exceeding a processor predetermined timeout threshold value based on the time required for an access request to be handled by the shared register.

2. A computer-implemented method as claimed in claim 1, wherein the processor predetermined timeout threshold value further includes a clock cycle-based buffer time.

3. A computer-implemented method as claimed in claim 1, comprising:
    starting a shared register access timer responsive to receipt of the first processor access request by the shared storage component; and
    generating a shared register access timeout error responsive to the shared register access timer exceeding a register access predetermined timeout threshold value.

4. A computer-implemented method as claimed in claim 3, wherein the processor predetermined timeout threshold value is greater than the register access predetermined timeout threshold value.

5. A computer-implemented method as claimed in claim 3, wherein the register access predetermined timeout threshold value includes a clock cycle-based buffer time.

6. A computer-implemented method as claimed in claim 3, comprising:
  starting a second processor access timer responsive to generation of a second access request by another processor; wherein the second processor access request is received by an interface component of the shared storage component;
  transmitting the generated second processor access request to the shared storage component via the interface component; and
  generating a timeout error responsive to the second processor access timer exceeding a second processor predetermined timeout threshold value.

7. A computer-implemented method as claimed in claim 6, wherein the second processor predetermined timeout threshold value is based on the processor predetermined timeout threshold value and the register access predetermined timeout threshold value.

8. A computer-implemented method as claimed in claim 7, wherein the second processor predetermined timeout threshold value further includes a clock cycle-based buffer time.

9. A computer-implemented method of generating timeout errors based on shared register access by at least two processors, comprising:
  starting a processor access timer responsive to generation of an access request by a first processor; wherein the first processor access request is received by an interface component of a shared storage component;
  transmitting the generated first processor access request to the shared storage component including a shared register, wherein the shared storage component is configured to communicate with the at least two processors; and
  generating a timeout error responsive to the processor access timer exceeding a processor predetermined timeout threshold value, wherein the processor predetermined timeout threshold value is based on a second processor predetermined timeout threshold value and a register access predetermined timeout threshold value.

10. A computer-implemented method as claimed in claim 9, comprising:
  starting a shared register access timer responsive to receipt of the first processor access request by the shared storage component; and
  generating a shared register access timeout error responsive to the shared register access timer exceeding the register access predetermined timeout threshold value.

11. A computer-implemented method as claimed in claim 10, comprising:
  starting a second processor access timer responsive to generation of a second access request by another processor;
  transmitting the generated other processor access request to the shared storage component; and
  generating a timeout error responsive to the second processor access timer exceeding a second processor predetermined timeout threshold value.

12. A computer-implemented method as claimed in claim 11, wherein the second processor predetermined timeout threshold value is based on the register access predetermined timeout threshold value.

13. A memory or a computer-readable medium storing instructions which, when executed by a processor, cause the processor to perform the method of claim 1.

14. A memory or a computer-readable medium storing instructions which, when executed by a processor, cause the processor to perform the method of claim 9.

15. A computer-implemented method as claimed in claim 1, wherein the starting a processor access timer comprises starting the processor access timer by the first processor.

16. A computer-implemented method as claimed in claim 1, wherein the transmitting the generated first processor access request comprises transmitting, by the first processor, the first processor access request.

17. A computer-implemented method as claimed in claim 9, wherein the starting a processor access timer comprises starting the processor access timer by the first processor.

18. A computer-implemented method as claimed in claim 9, wherein the transmitting the generated first processor access request comprises transmitting, by the first processor, the first processor access request.

* * * * *